(12) United States Patent
Li

(10) Patent No.: US 10,996,392 B2
(45) Date of Patent: May 4, 2021

(54) BACKLIGHT MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Qilin Li, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 254 days.

(21) Appl. No.: 16/097,737

(22) PCT Filed: Mar. 2, 2018

(86) PCT No.: PCT/CN2018/077877
§ 371 (c)(1),
(2) Date: Oct. 30, 2018

(87) PCT Pub. No.: WO2018/210032
PCT Pub. Date: Nov. 22, 2018

(65) Prior Publication Data
US 2020/0341187 A1    Oct. 29, 2020

(30) Foreign Application Priority Data
May 15, 2017   (CN) .......................... 201720533577.8

(51) Int. Cl.
*G02F 1/01*      (2006.01)
*F21V 8/00*      (2006.01)
*G02F 1/1333*    (2006.01)

(52) U.S. Cl.
CPC ..... *G02B 6/0088* (2013.01); *G02F 1/133328* (2021.01)

(58) Field of Classification Search
CPC ........ G02F 2001/133314; G02F 2001/133317; G02F 1/133314; G02F 1/133328; G02F 1/133308; G02F 1/13332; G02B 6/0088
See application file for complete search history.

(56) References Cited

U.S. PATENT DOCUMENTS 10,423,020 B2 *  9/2019  Sun ..................... G02B 6/0065
2015/0123334 A1   5/2015  Huang
(Continued)

FOREIGN PATENT DOCUMENTS

CN       105446007       3/2016
CN       206710753       12/2017
(Continued)

OTHER PUBLICATIONS

International Search Report and Written Opinion of the International Searching Authority corresponding to International Patent Application No. PCT/CN2018/077877, dated May 21, 2018. (15 pages with English translation).

*Primary Examiner* — Karabi Guharay
(74) *Attorney, Agent, or Firm* — Myers Bigel, P.A.

(57) ABSTRACT

The present disclosure provides a backlight module and a display device. The backlight module comprises a housing frame and a back plate. The housing frame comprises a main body part, a panel bearing part, and a first clamping part extending toward the back plate. The back plate comprises a bottom wall, a side wall substantially perpendicular to the bottom wall, and a second clamping part extending from the side wall towards the housing frame. The first clamping part is clamped between the second clamping part and the bottom wall.

20 Claims, 2 Drawing Sheets

(56) References Cited

U.S. PATENT DOCUMENTS

2019/0004362 A1* 1/2019 Wei .................. G02F 1/133308
2019/0064576 A1   2/2019 Sun et al.
2019/0154908 A1* 5/2019 Yabuuchi ............. G02B 6/0088

FOREIGN PATENT DOCUMENTS

| EP | 2871026 | 5/2015 |
|----|---------|--------|
| TW | 200825554 | 6/2008 |
| TW | 201017289 | 5/2010 |

* cited by examiner

BACKLIGHT MODULE AND DISPLAY DEVICE

CROSS-REFERENCE TO RELATED APPLICATIONS

The present application is the U.S. national phase entry of the international application PCT/CN2018/077877, with an international filing date of Mar. 2, 2018, which claims the benefit of Chinese Patent Application No. 201720533577.8 filed on May 15, 2017, the entire disclosures of which are incorporated herein by reference.

TECHNICAL FIELD

The present disclosure relates to the field of display technology, in particular to a backlight module and a display device comprising the backlight module.

BACKGROUND

Generally, in a design of a display device, a housing frame and a back plate of a backlight module are clamped and connected by a clamping part on the housing frame and a clamping hole on the back plate. Since the clamping hole on the back plate cannot be chamfered after a stamping process, and the limiting hole on the back plate is usually obtained through stamping and cutting, sharp burrs are easily formed around the limiting hole and interact with the clamping part on the housing frame, generating debris. The debris falling into the backlight module may cause picture defect of the backlight module, and further affect the display effect of the display device. In the prior art, screw connection between a housing frame and a back plate is not easy to generate debris, but the low assembly efficiency leads to a high production cost.

SUMMARY

The present disclosure intends to solve at least one of the technical problems existing in the prior art, and proposes a backlight module and a display device comprising the backlight module.

According to the first aspect of the present disclosure, a backlight module is provided. The backlight module comprises a housing frame and a back plate; the housing frame comprises a main body part, a panel bearing part, and a first clamping part extending towards the back plate; the back plate comprises a bottom wall, a side wall substantially perpendicular to the bottom wall, and a second clamping part extending from the side wall towards the housing frame. The first clamping part is clamped between the second clamping part and the bottom wall.

Optionally, at least one of edges of the first clamping part that are in contact with the second clamping part is provided with a first chamfer.

Optionally, the first chamfer is a fillet. A radius of the fillet is greater than 0.1 mm and less than two-thirds of an overlapping width of an orthographic projection of the first clamping part on the bottom wall and an orthographic projection of the second clamping part on the bottom wall.

Optionally, at least one of edges of the second clamping part that are in contact with the first clamping part is provided with a second chamfer.

Optionally, the second chamfer is a fillet. A radius of the fillet is greater than 0.1 mm and less than a thickness of the second clamping part at a position corresponding to the fillet.

Optionally, the second chamfer comprises a fillet arranged at a joint of the second clamping part and the side wall. A radius of the fillet is greater than 0.1 mm and less than a thickness of the side wall of the back plate at a position corresponding to the fillet.

Optionally, a surface of the panel bearing part facing a display panel is provided with a light-shielding tape.

Optionally, the backlight module further comprises an optical film arranged substantially parallel to the bottom wall; the light-shielding tape connects the surface of the panel bearing part facing the display panel and a surface of the optical film facing the display panel.

Optionally, the backlight module further comprises a light guide plate. An orthographic projection of the light guide plate on the bottom wall and an orthographic projection of the panel bearing part on the bottom wall are partially overlapped.

Optionally, an included angle between the second clamping part and the side wall is greater than 0 degree and less than or equal to 135 degrees.

According to the second aspect of the present disclosure, a display device is provided. The display device comprises a backlight module described in any of the above embodiments.

BRIEF DESCRIPTION OF THE DRAWINGS

The drawings are intended to provide a further understanding of the present disclosure, constitute a part of the specification and explain the present disclosure in conjunction with the specific embodiments below, rather than constitute a limitation to the present disclosure.

DETAILED DESCRIPTION OF THE DISCLOSURE

The embodiments of the present disclosure will be described in detail with reference to the accompanying drawings. It should be understood that the specific embodiments described herein are only for illustration and explanation of the present disclosure, and are not used for limiting the present disclosure.

Figure 1:
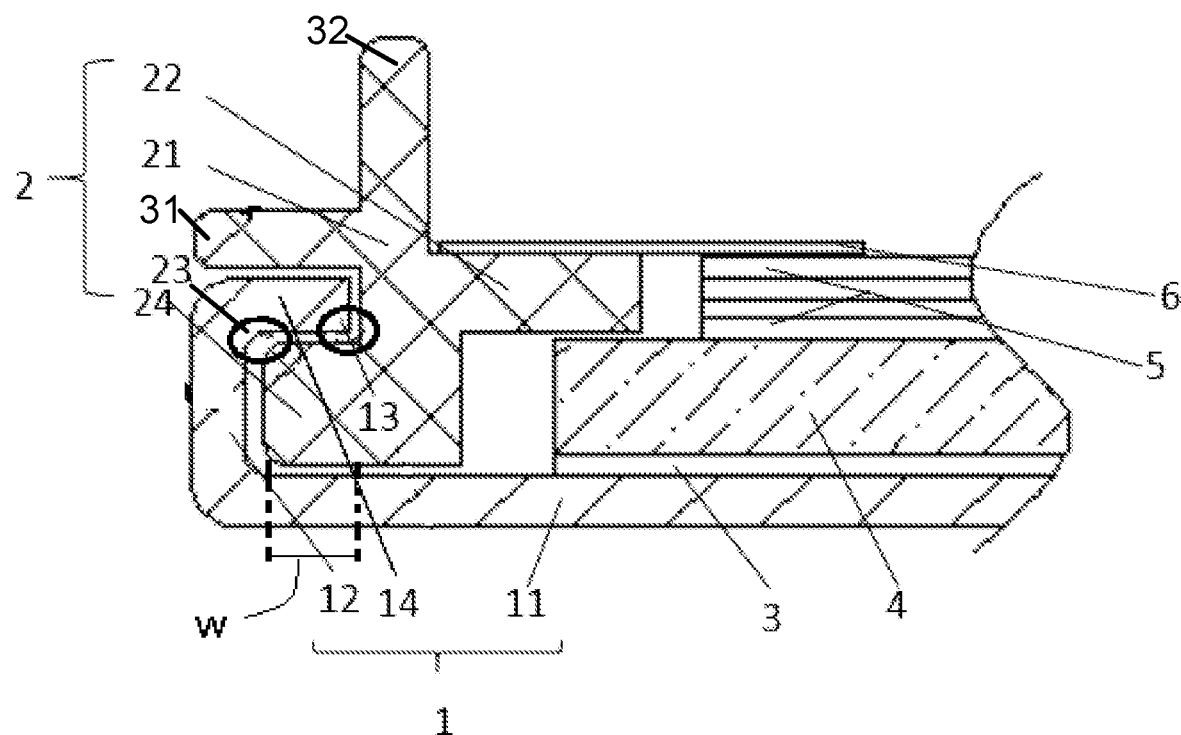
FIG. 1 is a structural schematic diagram of a backlight module of a display device according to the present disclosure.
Figure 2:
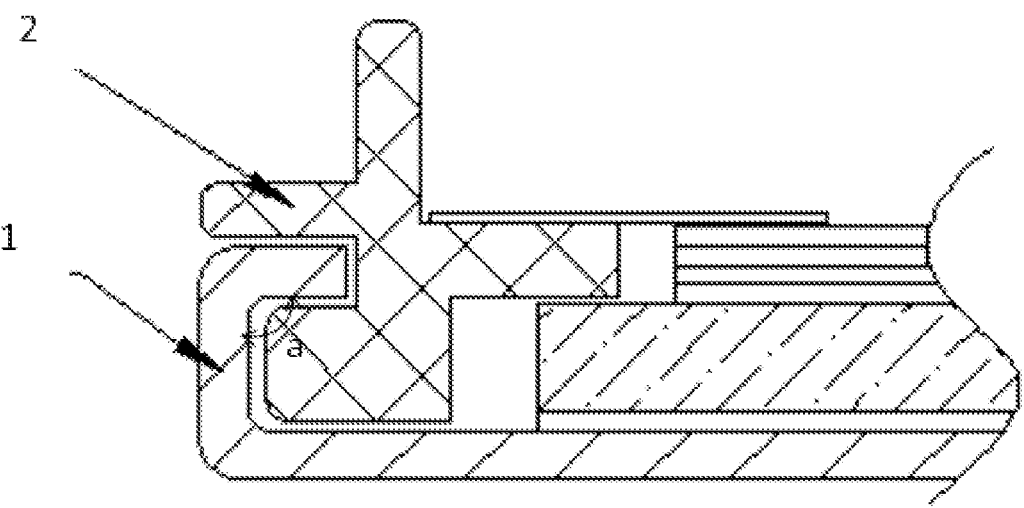
FIG. 2 is a schematic diagram of an included angle between a second clamping part and a side wall in a display device according to the present disclosure.

Referring to FIGS. 1 and 2, a backlight module is provided according to the first aspect of the present disclosure. The backlight module comprises a housing frame 2 and a back plate 1; the housing frame 2 comprises a main body part 21, a panel bearing part 22, and a first clamping part 24 extending towards the back plate; the back plate 1 comprises a bottom wall 11, a side wall 12 substantially perpendicular to the bottom wall, and a second clamping part 14 extending from the side wall 12 towards the housing frame 2. The first clamping part 24 is clamped between the second clamping part 14 and the bottom wall 11. The first clamping part 24 and the second clamping part 14 are matched with each other to fix the housing frame 2. The second clamping part 14 formed by bending the back plate is clamped and fixed with the first clamping part 24 of the housing frame 2, so that clamping debris caused by clamping of the frame clamping part and the positioning hole of the back plate in the prior art will be reduced. The housing frame 2 further comprises a first extension part 31 extending in a direction substantially parallel to an extension direction of the bottom wall 11 and a second extension part 32 extending in a direction substantially perpendicular to the extension direction of the bottom wall 11. An extension of the side wall 12 in a direction substantially perpendicular to the extension direction of the bottom wall 11 and away from the bottom wall 11 does not exceed the first extension part 31, and an extension of the first extension part 31 in a direction substantially parallel to the extension direction of the bottom wall 11 and away from the panel bearing part 22 exceeds the second extension part 32.

Optionally, at least one of edges of the first clamping part 24 that are in contact with the second clamping part 14 is provided with a first chamfer, as shown in the lower right corner of a region 13 and the lower right corner of a region 23 in FIG. 1. Optionally, the first chamfer is a fillet. A radius of the fillet is greater than 0.1 mm and less than two-thirds of an overlapping width w of an orthographic projection of the first clamping part 24 on the bottom wall 11 and an orthographic projection of the second clamping part 14 on the bottom wall 11 (as shown in FIG. 1).

Alternatively, at least one of edges of the second clamping part 14 that are in contact with the first clamping part 24 is provided with a second chamfer, as shown in the upper left corner of the region 13 and the upper left corner of the region 23 in FIG. 1. Optionally, the second chamfer is a fillet, and a radius of the fillet is greater than 0.1 mm and less than a thickness of the second clamping part at a position corresponding to the fillet. Optionally, the second chamfer comprises a fillet arranged at a joint of the second clamping part and the side wall, and a radius of the fillet is greater than 0.1 mm and less than a thickness of the side wall of the back plate at a position corresponding to the fillet.

The chamfer further reduces the amount of the debris generated when the housing frame is clamped with the second clamping part, and further ensures the quality of backlight module. The radius range of the chamfer can ensure that debris is reduced during clamping, and meanwhile, the possibility of disengaging is reduced.

Optionally, the backlight module further comprises a light guide plate. An orthographic projection of the light guide plate on the bottom wall and an orthographic projection of the panel bearing part on the bottom wall are partially overlapped.

Optionally, as shown in FIG. 2, the included angle α between the second clamping part and the side wall is greater than 0 degree and less than or equal to 135 degrees. This bending angle ensures that the component force in the clamping direction of the interaction force between the first clamping part and the second clamping part on the back plate due to the inertia force generated by self movement of a backlight module is greater than the component force in the disengaging direction. Edges of the first clamping part that are in contact with the second clamping part are provided with chamfers, and edges of the second clamping part that are in contact with the first clamping part are also provided with chamfers. At a clamping position of a housing frame and a back plate, two chamfers in contact with each other can reduce the probability of debris generation, thereby maintaining the uniform light intensity of the backlight module.

Figure 3:
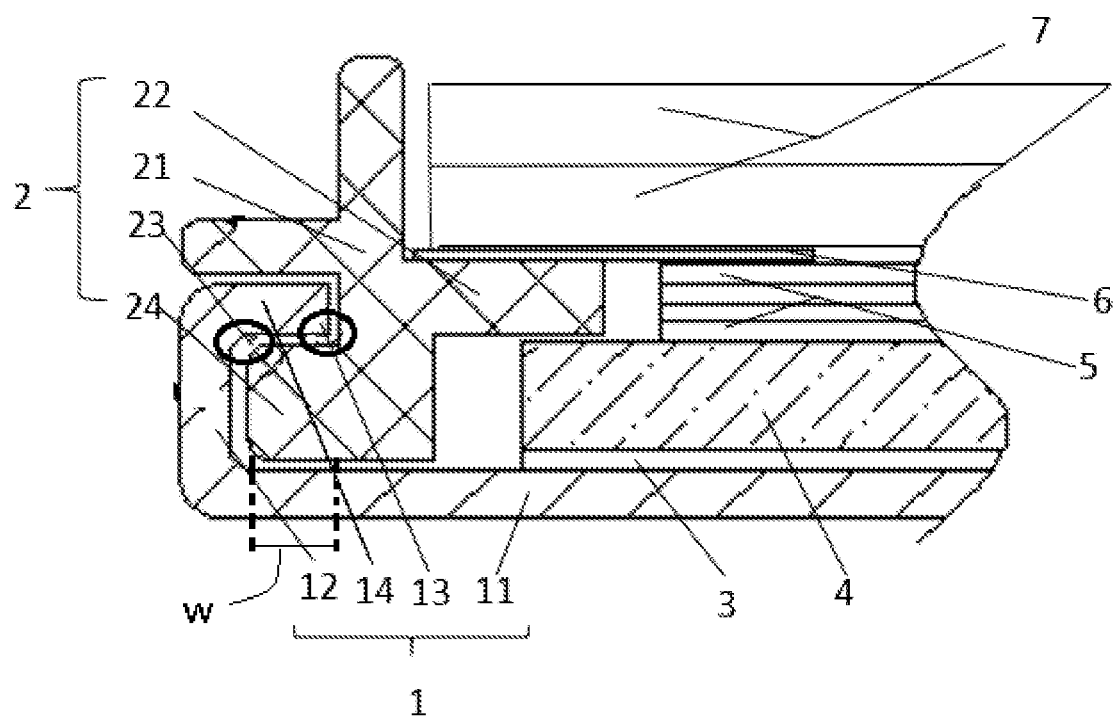
FIG. 3 is a structural schematic diagram of a display device according to the present disclosure.

Optionally, as shown in FIG. 3, a surface of the panel bearing part 22 facing a display panel 7 is provided with a light-shielding tape 6. The light-shielding tape connects the surface of the panel bearing part facing the display panel 7 and the surface of the optical film 5 facing the display panel 7, thereby reducing the possibility that the frame debris enters the interior of backlight module.

In a backlight module according to the present disclosure, the housing frame is connected with the second clamping part 14 on the back plate through the first clamping part 24. The second clamping part 14 is formed by bending the back plate to avoid sharp burrs generated by punching the back plate. Moreover, edges of the back plate and/or the clamping part of the housing frame are chamfered to further reduce the probability that the first clamping part of the housing frame interacts with the second clamping part of the back plate to generate debris. Therefore, the connection between the back plate and the housing frame is ensured to be simple and fast, and it is not easy to generate debris that cause picture defect of the backlight module.

According to the second aspect of the present disclosure, as shown in FIGS. 1, 2 and 3, a display device comprises a display panel 7 and a backlight module. The backlight module comprises the backlight module described in any of the above embodiments, and the display panel 7 is connected with the back plate 1 through the light-shielding tape 6 to further prevent the debris from entering the interior of the display module.

The display device may be an electronic device such as a display, a GPS navigator, a mobile phone, a notebook computer and a tablet computer.

According to the present disclosure, the display device is provided with the backlight module with the above structure and debris is not be easily generated when relative vibration occurs after the display module is assembled, so the use reliability of the display device is ensured.

It is to be understood that the above embodiments are merely exemplary embodiments adopted to illustrate the principles of the present disclosure, but the present disclosure is not limited thereto. For those skilled in the art, various variations and improvements may be made without departing from the spirit and essence of the present disclosure, and these variations and improvements are also considered within the protection scope of the present disclosure.

What is claimed is:

1. A backlight module, comprising:
a housing frame; and
a back plate,
wherein the housing frame comprises a main body part, a panel bearing part, and a first clamping part extending towards the back plate,
wherein the back plate comprises a bottom wall, a side wall substantially perpendicular to the bottom wall, and a second clamping part extending from the side wall toward the housing frame,
wherein the first clamping part is clamped between the second clamping part and the bottom wall,
wherein an end of the side wall away from the bottom wall of the back plate is directly connected to an end of the second clamping part away from the panel bearing part, and
wherein the housing frame further comprises a first extension part extending in a direction substantially parallel to an extension direction of the bottom wall and a second extension part extending in a direction substantially perpendicular to the extension direction of the bottom wall, wherein an extension of the side wall in a direction substantially perpendicular to the extension direction of the bottom wall and away from the bottom wall does not exceed the first extension part, and an extension of the first extension part in a direction substantially parallel to the extension direction of the bottom wall and away from the panel bearing part exceeds the second extension part.

2. The backlight module of claim 1,
wherein at least one edge of the first clamping part is in contact with the second clamping part and comprises a first chamfer.

3. The backlight module of claim 2,
wherein the first chamfer comprises a fillet, and
wherein a radius of the fillet is greater than 0.1 mm and less than two-thirds of an overlapping width of an orthographic projection of the first clamping part on the bottom wall of the back plate and an orthographic projection of the second clamping part on the bottom wall of the back plate.

4. The backlight module of claim 1, wherein at least one edge of the second clamping part is in contact with the first clamping part and comprises a second chamfer.

5. The backlight module of claim 4,
wherein the second chamfer comprises a fillet, and
wherein a radius of the fillet is greater than 0.1 mm and less than a thickness of the second clamping part at a position corresponding to the fillet.

6. The backlight module of claim 4,
wherein the second chamfer comprises a fillet at a joint of the second clamping part and the side wall of the back plate, and
wherein a radius of the fillet is greater than 0.1 mm and less than a thickness of the side wall of the back plate at a position corresponding to the fillet.

7. The backlight module of claim 1, wherein a surface of the panel bearing part facing a display panel comprises a light-shielding tape.

8. The backlight module of claim 7, further comprising:
an optical film that is substantially parallel to the bottom wall of the back plate,
wherein the light-shielding tape connects the surface of the panel bearing part facing the display panel and a surface of the optical film facing the display panel.

9. The backlight module of claim 1, further comprising:
a light guide plate,
wherein an orthographic projection of the light guide plate on the bottom wall of the back plate and an orthographic projection of the panel bearing part on the bottom wall of the back plate are partially overlapped.

10. The backlight module of claim 1, wherein an included angle between the second clamping part and the side wall of the back plate is greater than 0 degrees and less than or equal to 135 degrees.

11. A display device, comprising the backlight module of claim 1.

12. The display device according to claim 11, wherein at least one edge of the first clamping part is in contact with the second clamping part and comprises a first chamfer.

13. The display device according to claim 12,
wherein the first chamfer comprises a fillet, and
wherein a radius of the fillet is greater than 0.1 mm and less than two-thirds of an overlapping width of an orthographic projection of the first clamping part on the bottom wall of the back plate and an orthographic projection of the second clamping part on the bottom wall of the back plate.

14. The display device according to claim 11, wherein at least one edge of the second clamping part is in contact with the first clamping part and comprises a second chamfer.

15. The display device according to claim 14,
wherein the second chamfer comprises a fillet, and
wherein a radius of the fillet is greater than 0.1 mm and less than a thickness of the second clamping part at a position corresponding to the fillet.

16. The display device according to claim 14,
wherein the second chamfer comprises a fillet at a joint of the second clamping part and the side wall of the back plate, and
wherein a radius of the fillet is greater than 0.1 mm and less than a thickness of the side wall of the back plate at a position corresponding to the fillet.

17. The display device according to claim 11, wherein a surface of the panel bearing part facing a display panel comprises a light-shielding tape.

18. The display device according to claim 17, further comprising:
an optical film that is substantially parallel to the bottom wall,
wherein the light-shielding tape connects the surface of the panel bearing part facing the display panel and a surface of the optical film facing the display panel.

19. The display device according to claim 11, further comprising:
a light guide plate,
wherein an orthographic projection of the light guide plate on the bottom wall of the back plate and an orthographic projection of the panel bearing part on the bottom wall of the back plate are partially overlapped.

20. The display device according to claim 11, wherein an included angle between the second clamping part and the side wall of the back plate is greater than 0 degrees and less than or equal to 135 degrees.

* * * * *